(12) United States Patent
Hino

(10) Patent No.: US 8,266,380 B2
(45) Date of Patent: Sep. 11, 2012

(54) CACHE MEMORY CONTROL METHOD AND CACHE MEMORY APPARATUS

(75) Inventor: Mitsuaki Hino, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 483 days.

(21) Appl. No.: 11/742,155

(22) Filed: Apr. 30, 2007

(65) Prior Publication Data

US 2008/0028151 A1    Jan. 31, 2008

(30) Foreign Application Priority Data

Jul. 28, 2006  (JP) ................. 2006-207076

(51) Int. Cl.
    *G06F 12/00* (2006.01)
(52) U.S. Cl. ............. 711/118; 711/3; 711/209; 345/571
(58) Field of Classification Search .............. 711/209, 711/3, 118; 345/564, 566, 571, 573, 557, 345/609, 569
    See application file for complete search history.

(56) References Cited

U.S. PATENT DOCUMENTS

| | | | |
|---|---|---|---|
| 5,749,089 A * | 5/1998 | Yoshizawa et al. | 711/127 |
| 6,353,438 B1 * | 3/2002 | Van Hook et al. | 345/552 |
| 7,406,579 B2 | 7/2008 | Blanco et al. | |
| 2004/0093458 A1 * | 5/2004 | Kanno et al. | 711/5 |
| 2006/0277352 A1 * | 12/2006 | Pong | 711/3 |

FOREIGN PATENT DOCUMENTS

| | | |
|---|---|---|
| JP | 4-153753 | 5/1992 |
| JP | 05-053909 | 3/1993 |
| JP | 09-101915 | 4/1997 |
| JP | 10-154230 | 6/1998 |
| JP | 2001-216193 | 8/2001 |
| JP | 2005-215891 | 8/2005 |
| JP | 2006-510992 | 3/2006 |

OTHER PUBLICATIONS

English Translation of Foreign Application JP 09-101915.*
English Machine Translation of Foreign Application JP 10-154230.*
Japanese Office Action mailed Mar. 6, 2012 for corresponding Japanese Application No. 2006-207076, with English-language translation.

* cited by examiner

*Primary Examiner* — Matthew Bradley
(74) *Attorney, Agent, or Firm* — Fujitsu Patent Center (57) ABSTRACT

The present invention is contrived to divide an address for accessing cache memory into a first through a fourth fields from the uppermost bit side, use the first and third fields for respectively storing tag addresses, divide the second and fourth fields into one or more subfields, respectively, use one or more subfields for storing index addresses, and use the remaining subfields for respectively storing line addresses. The second field is handled as one subfield, for example, for storing an index address, and the fourth field is divided into two subfields for storing an index address in one and a line address in the other. Such a configuration manages a form of a block of which data is stored in one entry.

10 Claims, 12 Drawing Sheets

//CACHE MEMORY CONTROL METHOD AND CACHE MEMORY APPARATUS

CROSS REFERENCE TO RELATED APPLICATIONS

This application is based upon and claims the benefit of priority from the prior Japanese Patent Application No. 2006-207076 filed on Jul. 28, 2006, the entire contents of which are incorporated herein by reference.

BACKGROUND OF THE INVENTION

1. Field of the Invention

The present invention relates to a technique for accessing to cache memory comprising, for each entry, a data unit for storing data and a tag unit for storing a tag address which is an index of the data.

2. Description of the Related Art

Cache memory capable of a higher speed as compared to main memory is currently a compulsory requirement for higher speed data processing. A cache memory apparatuses accessing cache memory according to a designated address include one equipped within a central processing unit (CPU) and one furnished on the outside thereof.

Figure 1A:
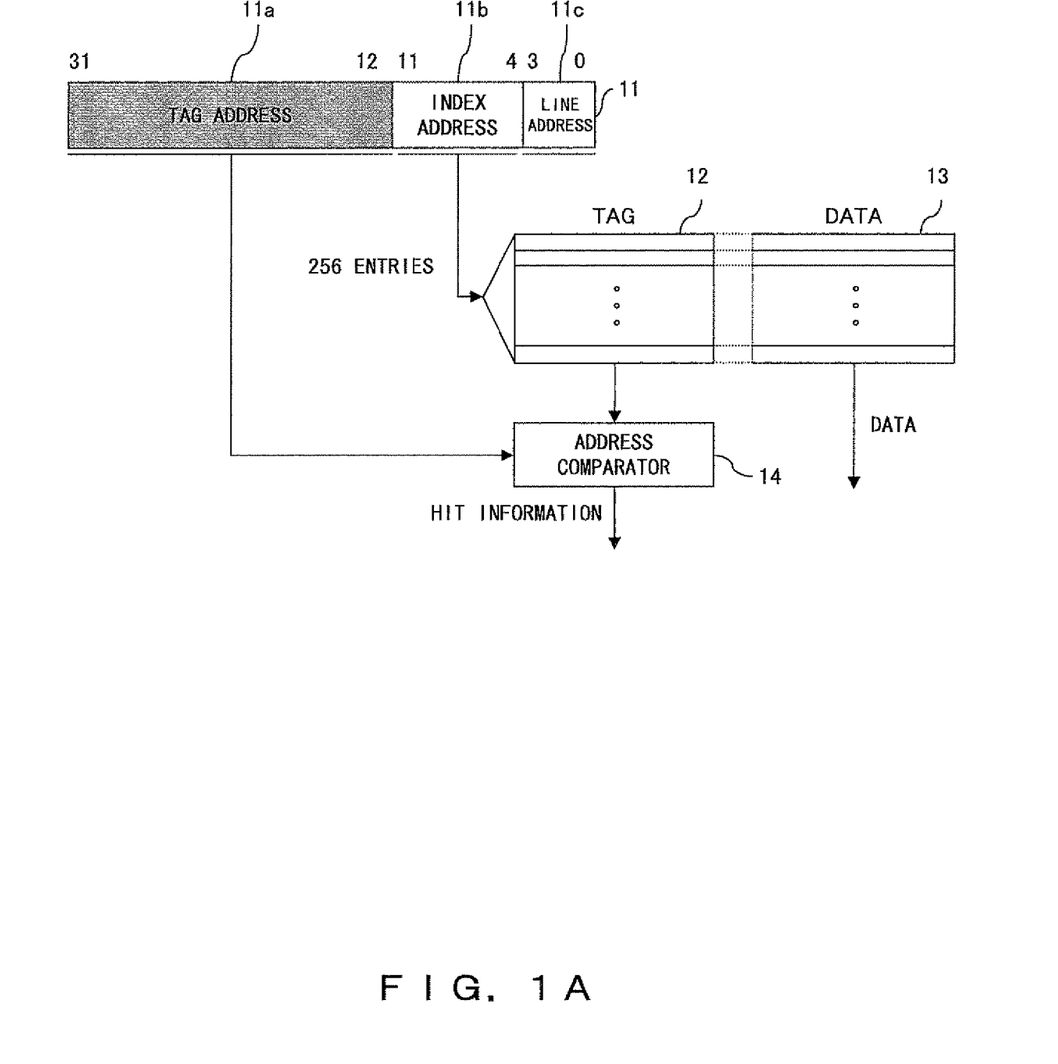
FIG. 1A is a diagram showing a configuration of a conventional cache memory apparatus.
Figure 1B:
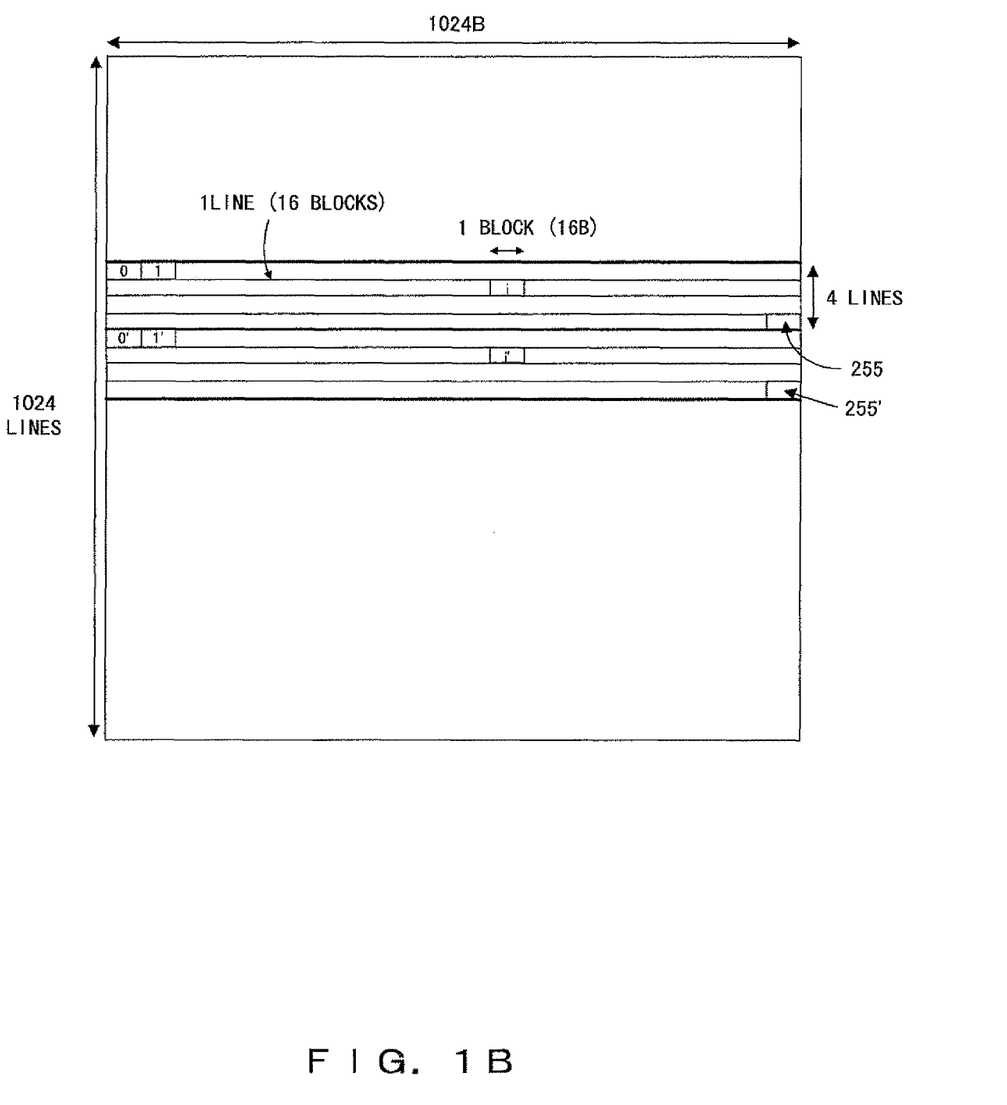
FIG. 1B is a diagram showing an arrangement of data within main memory to be stored in the cache memory constituting a conventional cache memory apparatus.

FIG. 1A is a diagram showing a configuration of a conventional cache memory apparatus, and FIG. 1B is a diagram showing a layout of data within main memory to be stored in the cache memory. FIG. 1B exemplifies a layout of each piece of pixel data in the case of storing image data of one byte for one pixel in the main memory. The image data is one divided into 1024 pixels in the horizontal direction and 1024 lines in the vertical direction, with the pixel data being laid out in the position corresponding to a coordinate.

As shown in FIG. 1A, the cache memory constituting a conventional cache memory apparatus is constituted by a tag part 12 for storing a tag address, and by a data part 13 storing data, both for each entry. An address 11 specified by a CPU, et cetera, has a structure of laying out fields 11a through 11c storing, from the uppermost bit side, a tag address, an index address and a line address, respectively. The tag address is used for indexing data which is stored or to be stored. The index address is for specifying an entry (number). The line address is for specifying data which is stored or to be stored in an entry specified by the index address. In this specification, the assumption is that the data of one address is worth of one byte, and one entry (i.e., block) is capable of storing sixteen bytes of data (i.e., data in the amount of sixteen pixels). Also assumed is the number of entries being 256. Assumption for the address 11 is, from the uppermost bit, 20 bits are allocated to the tag address, 8 bits to the index address and 4 bits to the line address. It is called a "cache address" hereinafter for avoiding confusion.

The next is a description of an operation.

In the case of a read request for reading data from the data part 13 being made, a tag address of an entry specified by the index address is read from the tag part 12, the tag address is compared with a tag address included in the cache address 11 by an address comparator 14 and the comparison result is output as hit information. The hit information constitutes one indicating that a target piece of data exists, that is, being hit, if the tag addresses are identical, while it constitutes the one indicating that the target piece of data does not exist, that is, being miss-hit, if these tag addresses are not identical. Accordingly, the data stored in the entry specified by the index address is read from the data part 13 and processed in the case of hit information indicating the fact of a hit being output from the address comparator 14.

Comparably, in the case of a write request for storing data in the data part 13 being made, a tag address of the cache address 11 is stored in an entry specified by the index address of the tag part 12, and the data is stored in the data part 13 according to a line address of the cache address 11.

In the cache address 11, an index address stored in a field 11b is for indicating a position on a line. One entry is configured to allow storage of the amount of sixteen pixels. By this, one line is data in the amount of 64 (i.e., 1024/16) blocks (i.e., entries) as shown in FIG. 1B. In FIG. 1B, each frame in which "0", "1" or "255" is written, within a range of four lines, indicates data in the amount of one entry. Therefore, if 1024 pixels are lined up in the horizontal direction (i.e., one line), the indication is that 256 entries are required to store data in the amount of four lines.

Figure 2:
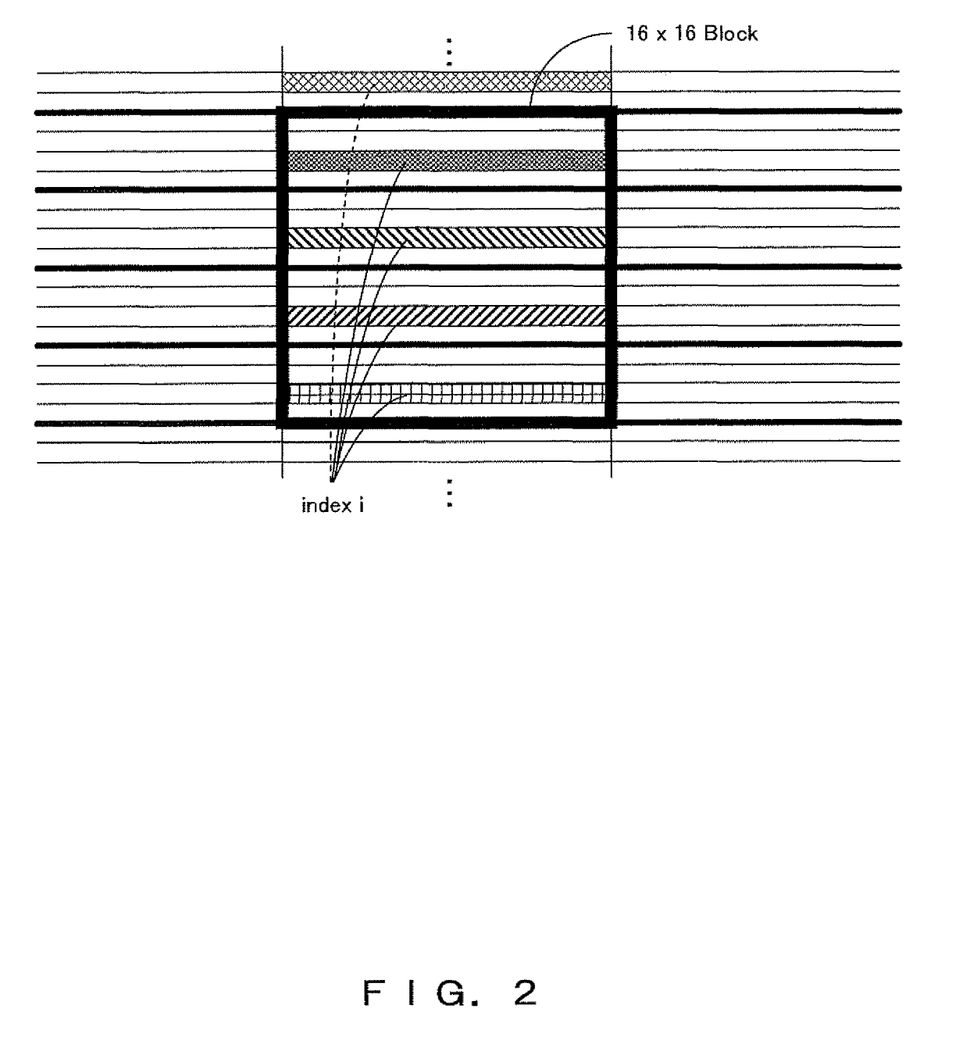
FIG. 2 is a diagram showing a reason for a hit ratio degrading in a conventional cache memory apparatus.

The conventional cache memory apparatus shown in FIG. 1A is the one adopting a direct map system. In the direct map system, there is only one entry (i.e., space) capable of storing data corresponding to a tag address. The only one piece of data among data of blocks having the same index address and different tag addresses can be stored. An index address stored in the field 11 is for indicating a position on a line. Therefore, even in the case of processing data of a 16×16 block (i.e., 16 pixels horizontal and 16 lines vertical) for example, as shown in FIG. 2, the data in the amount of only one line can be stored in the cache memory. Because of this, a hit ratio is extremely low. That is, a replacement for rewriting data occurs frequently due to a misfit, hence degrading a processing performance greatly. An "index i" shown in FIG. 2 indicates an index address corresponding to data within a 16×16 block as a target of processing.

Most of image processing carries out a process in the unit of rectangular block such as 16×16. The conventional cache memory apparatus shown in FIG. 1A, however, is not capable of storing data of a plurality of lines which is lined up in the vertical direction. Accordingly, the conventional cache memory apparatuses include ones comprising a capability of storing data of a plurality of lines lined up in the vertical direction as respectively noted in a Laid-Open Japanese Patent Application Publication No. 09-53909 (noted as "patent document 1" hereinafter), No. 09-101915 (noted as "patent document 2" hereinafter), and No. 10-154230 (noted as "patent document 3" hereinafter).

The cache address 11 shown in FIG. 1A has a structure of laying out fields 11a through 11c storing, from the uppermost bit side, a tag address, an index address and a line address as described above. The conventional cache memory apparatus noted in the patent document 1 adopts a structure, for a cache address 11, of laying out fields respectively storing, from the uppermost bit side, a tag address, a first index address, a first line address, a second index address and a second line address. By this, an entry is specified by the first and second index addresses and an address within the entry is specified by the first and second line addresses. By so doing, it is possible to store, in one entry, data in the amount of the number of pixels according to the number of bits allocated to a field for storing the second line address in the horizontal direction and data in the amount of a block of the number of lines according to the number of bits allocated to a field for storing the first line address in the vertical direction. Therefore, it is possible to store data in the amount of a 4×4 block if the former and latter are 2-bit, for example.

In image processing, a reference to an adjacent block is also performed frequently. Data of a block adjacent to the present block in the vertical direction can be stored in another entry by changing the tag address and first index address. Therefore, an access to pixel data lined up in the vertical direction can be carried out without a replacement. In a block adjacent in the horizontal direction, however, the data cannot be stored in another entry because the tag address is the same. That is, the data of a block adjacent in the horizontal direction must be stored in cache memory by a replacement. Because of this, an improvement of a hit ratio cannot be conventionally expected in the case of carrying out image processing.

Figure 3:
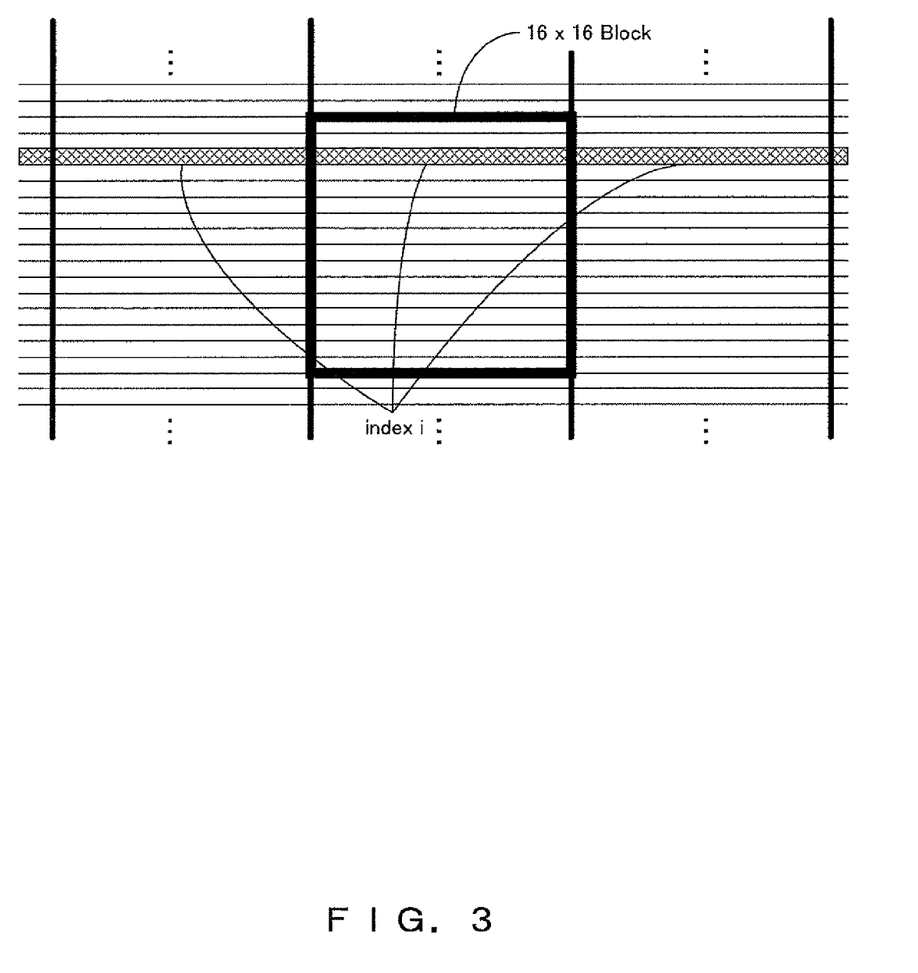
FIG. 3 is a diagram showing a reason for a hit ratio degrading in a conventional cache memory apparatus noted in the patent document 2.

The conventional cache memory apparatus noted in the patent document 2 adopts a structure, for a cache address 11, laying out fields respectively storing, from the uppermost bit side, a first tag address, an index address, a second tag address and a line address. It makes a low bit indicating a position of a pixel on a line as a line address, and an upper bit than the aforementioned as a second tag address. By this, data of a block (i.e., a block made up of a plurality of pixels which is lined up on one line herein) adjacent in the vertical direction can be stored in a different entry. However, because of making a low bit indicating a position of a pixel on a line as a line address, and an upper bit than the aforementioned as a second tag address, a value of the index address on the same line becomes the same as shown in FIG. 3. Therefore, an improvement of a hit ratio cannot be conventionally expected in the case of carrying out image processing.

The above noted patent document 2 additionally notes another conventional cache memory apparatus adopting a structure, for a cache address 11, of laying out fields respectively storing, from the uppermost bit side, a first tag address, a first index address, a second tag address, a first line address, a second index address, a third tag address and a second line address.

Data of an adjacent block both in the horizontal and vertical directions can be stored in a different entry by dividing the cache address 11 and laying out two tag addresses in the form of correlating with two line addresses respectively, thereby making it possible to greatly improve a hit ratio.

Both of the former and latter assume image data to be an image divided into 1024 pixels in the horizontal direction and 1024 lines in the vertical direction. One pixel data is one byte. The number of entries is 256. Therefore, ten bits are required to indicate a position of a pixel in the horizontal direction, and so are ten bits for indicating a position of a line in the vertical direction. The latter (another conventional cache memory apparatus noted in the patent document 2) adds four bits to the required ten bits both for the horizontal and vertical directions and uses the four bits as fields for storing the third and second index addresses.

The number of bits required for the cache address 11 is increased by adding such two index addresses (i.e., fields). Due to this, there is a possibility of the number of bits exceeding a data bus or a bit width of a register. In the former and the conventional cache memory apparatus noted in the patent document 1 which are required for the address 11, the configuration is such as to automatically determine an entry for storing data from a storage position of data in the main memory. In the case of adding two index addresses, they must be determined so as to store them in an entry for storing data. Because such a determination must be carried out, an access control becomes that much more complex. Therefore, the addition of two index addresses is considered to be not preferable.

Figure 4:
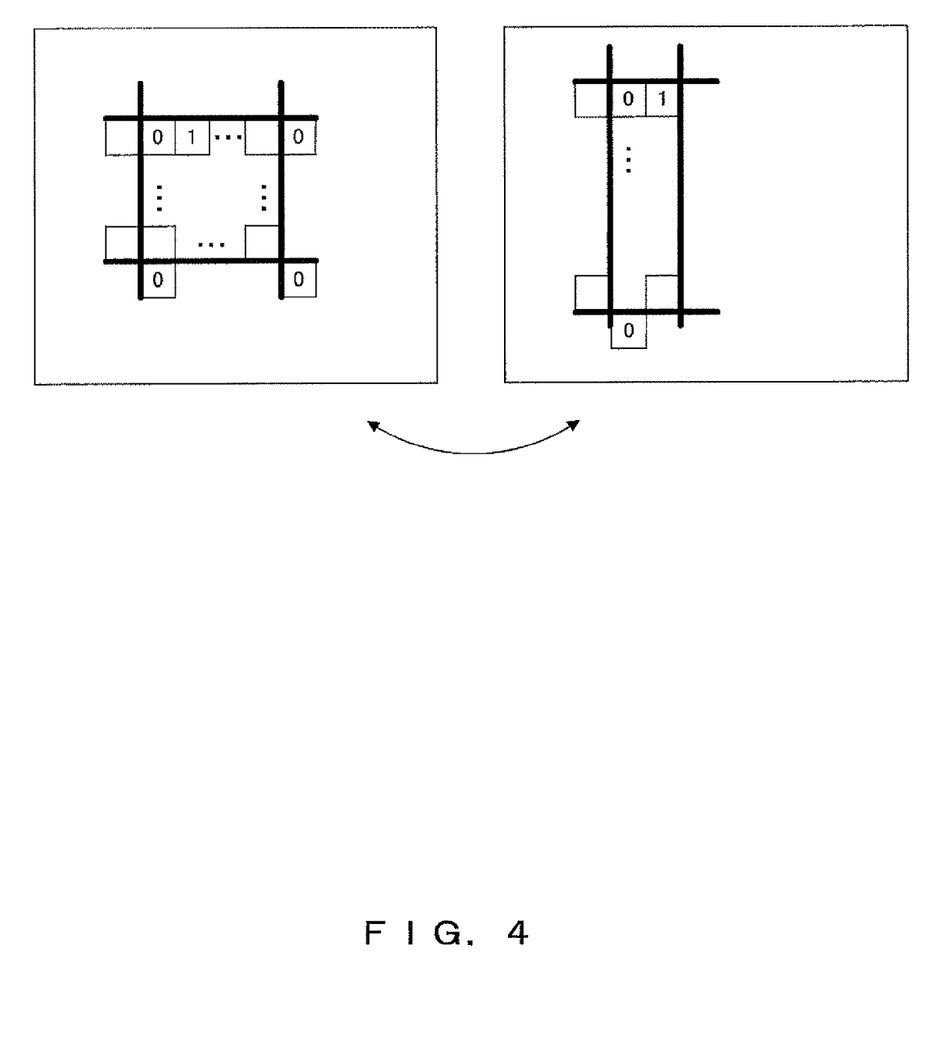
FIG. 4 is a diagram showing a change of a range allowing a data storage in cache memory accomplished by a conventional cache memory apparatus noted in the patent document 3.

A conventional cache memory apparatus noted in the patent document 3 adopts a structure, for a cache address 11, laying out fields for respectively storing a coordinate y indicating a position of a line in the vertical direction and a coordinate x indicating a position of a pixel in the horizontal direction. It divides each field into two subfields and makes one which lays out, from the upper most bit side, a lower bit of the coordinate y and x as an index address respectively. It makes one which lays out, from the upper most bit side, an upper bit of the coordinate y and x as a tag address respectively. Data of an adjacent block can be stored in a different entry for both of the horizontal and vertical directions by dividing a bit string indicating the coordinates x and y into two parts, and using one part as a tag address and the other part as an index address. Because of this, a hit ratio can be greatly improved. A range (i.e., a form) of image data whose data is stored in the cache memory is changed by changing the way of dividing a bit string indicating the coordinates x and y as shown in FIG. 4. The frames marked by "0" and "1" shown in FIG. 4 indicate data in the amount of one entry, respectively.

The conventional cache memory apparatus noted in the patent document 3 is configured to carry out a storing and reading data in and from the cache memory by the unit of entry. In order to carry it out in the unit of entry, data to be stored in one entry is made as the data of a block of a predetermined fixed form (i.e., data of a plurality of pixels lined up in the horizontal direction.

In order to improve a process performance, the important is also a decreased number of accesses to the cache memory. In the case of storing data of a fixed form block in each entry, there is a possibility of an increased number of accesses depending on a relationship between the aforementioned form and data as a target of processing. For example, if a block of a fixed form is sixteen pixels lined up in the horizontal direction, four times of readouts are required for reading all of pixel data of a 4×4 block. Therefore, the form of a block is preferably enabled to be changed on an as required basis. A provision of the capability of a change conceivably enables an effective utilization of cache memory.

SUMMARY OF THE INVENTION

The purpose of the present invention is to provide a technique for utilizing cache memory more effectively while achieving a high hit ratio.

According to a first aspect through a third aspect of the present invention, a cache memory control method, premising a use for a control of accessing cache memory comprising a data part and a tag part for storing a tag address used for indexing the data, respectively perform an access control as follows.

A cache memory control method according to a first aspect comprises: dividing an address for accessing the cache memory into a first field through a fourth field from the uppermost bit side; using the first and third fields for storing tag addresses; and dividing the second and fourth fields respectively into one or more subfields, and using one or more subfields for storing index addresses and the rest of the subfields for storing line addresses.

A cache memory control method according to a second aspect comprises: dividing an address for accessing the cache memory into a first through fifth fields from the uppermost bit side; using the first and third fields for storing tag addresses; using the second and fourth fields for storing index addresses; and using the fifth field for storing a line address.

A cache memory control method according to a third aspect comprises: dividing an address for accessing the cache memory into a first through sixth fields from the uppermost bit side; using the first and fourth fields for storing tag addresses; using the second and fifth fields for storing index addresses; and using the third and sixth fields for storing line addresses.

According to the first through third aspects of the present invention, a cache memory apparatus accessing cache memory comprising, for each entry, a data part and for storing data and a tag part for storing a tag address which is for indexing the data respectively comprises units as follows.

A cache memory apparatus according to the first aspect comprises: a first extraction unit for extracting data respectively stored in a first and a third fields as tag addresses, assuming that an address specified for accessing the cache memory is arranged by a first through a fourth fields from the uppermost bit side; and a second extraction unit for extracting data stored in one or more subfields as index addresses, and those stored in the remaining subfields as line addresses assuming that the second and fourth fields are respectively constituted by one or more subfields.

A cache memory apparatus according to the second aspect comprises: a first extraction unit for extracting data stored in a first and a third fields as tag addresses, assuming that an address specified for accessing the cache memory is arranged by a first through a fifth fields from the uppermost bit side; and a second extraction unit for extracting data stored in the second and fourth fields as index addresses; and a third extraction unit for extracting data in the fifth field as a line address.

A cache memory apparatus according to the third aspect comprises: a first extraction unit for extracting data stored in a first and a fourth fields as tag addresses, assuming that an address specified for accessing the cache memory is arranged by a first through a sixth fields from the uppermost bit side; a second extraction unit for extracting data stored in the second and fifth fields as index addresses; and a third extraction unit for extracting data in the third and fifth fields as line addresses.

The present invention is contrived to divide an address for accessing cache memory into the first through fourth fields from the uppermost bit side, use the first and third fields for storing tag addresses, divide the second and fourth fields respectively into one or more subfields and use one or more subfields for storing index addresses and the remaining subfields for storing a line address. It for example handles the second field as one subfield and uses it for storing an index address, divides the fourth field into two subfields, uses one of them for storing an index address and the other for storing a line address. Or, it divides the second and fourth fields respectively into two subfields, uses the respective ones for storing index addresses and the respective others for storing line addresses.

Taking an example of data to be stored in cache memory being image data which is an image broken into pixels, a utilization of data in the fourth field as an index address makes it possible to differentiate an index address relative to a block which is positioned in the horizontal direction of a block (i.e., an image block) of which the data is stored in one entry. It is also possible to differentiate the index address relative to a block which is positioned in the vertical direction by utilizing the data of the second field as an index address. Therefore, the data of a plurality of blocks lined up in either the horizontal direction or vertical direction can be stored in different entries. A form of the block can be controlled (managed) by the numbers of bits used for respectively storing index addresses in the second and fourth fields.

DESCRIPTION OF THE PREFERRED EMBODIMENTS

The following is a detailed description of the preferred embodiment of the present invention by referring to the accompanying drawings.

Figure 5:
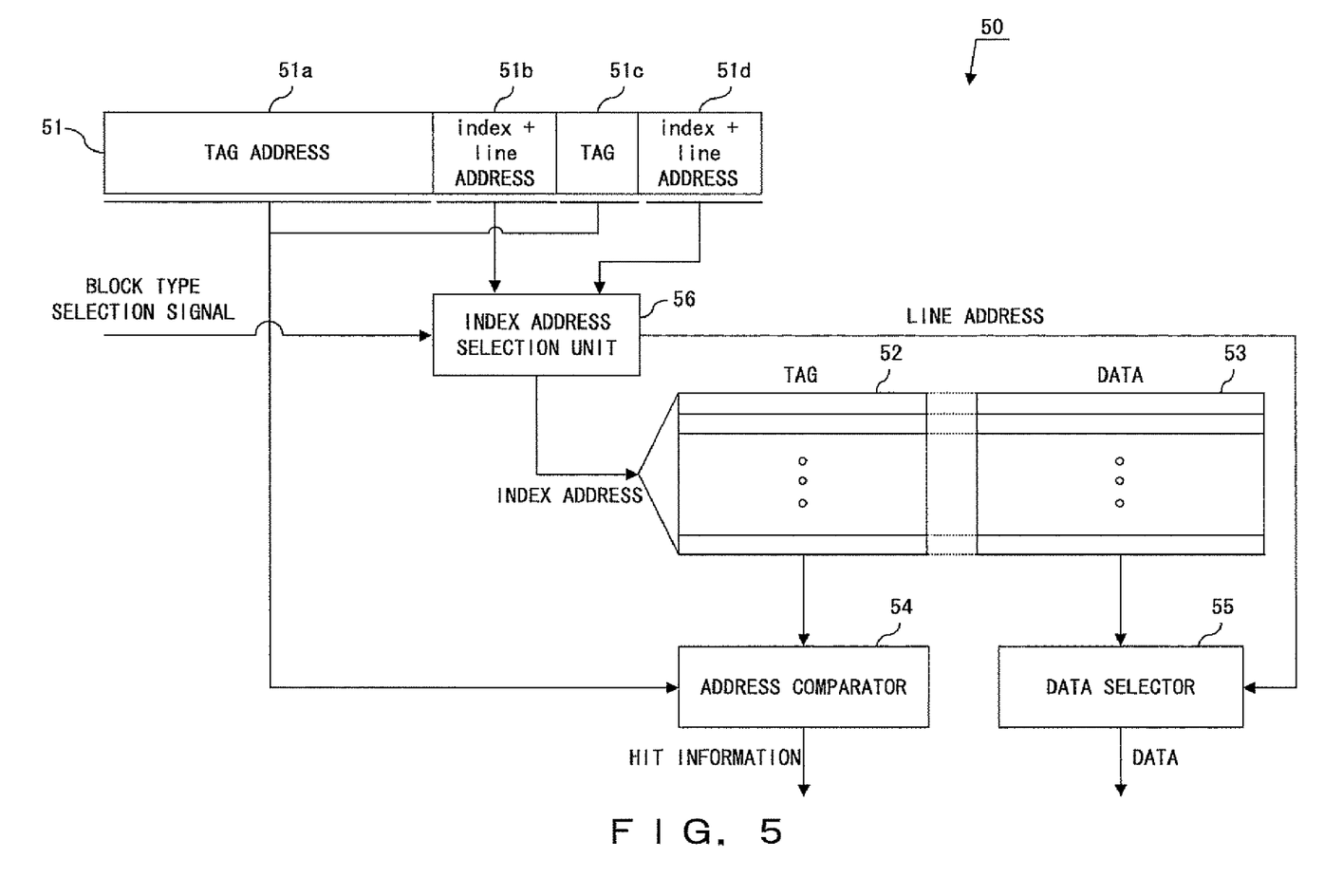
FIG. 5 is a diagram showing a configuration of a cache memory apparatus according to an embodiment of the present invention.

FIG. 5 is a diagram showing a configuration of a cache memory apparatus according to the present embodiment.

Referring to FIG. 5, cache memory constituting a cache memory apparatus 50 according to the present embodiment comprises a tag part 52 for storing a tag address and a data part 53 for storing data for each entry. It also comprises an address comparator 54, a data selector 55 and an index address selection unit 56 as comprisal for accessing the cache memory.

An address (i.e., a cache address) 51 specified by a CPU is configured to arrange, from the uppermost bit side, a first through fourth fields 51a through 51d as shown in FIG. 5. The first field 51a stores a tag address (i.e., a first tag address), the second field 51b stores an index address, or it and a line address, the third field 51c stores a tag address (i.e., a second tag address), and the fourth field 51d stores an index address and a line address. A tag address is for indexing data stored or data to be stored. An index address is for specifying an entry (i.e., a number). A line address is for specifying data stored or data to be stored in an entry specified by an index address.

Figure 11:
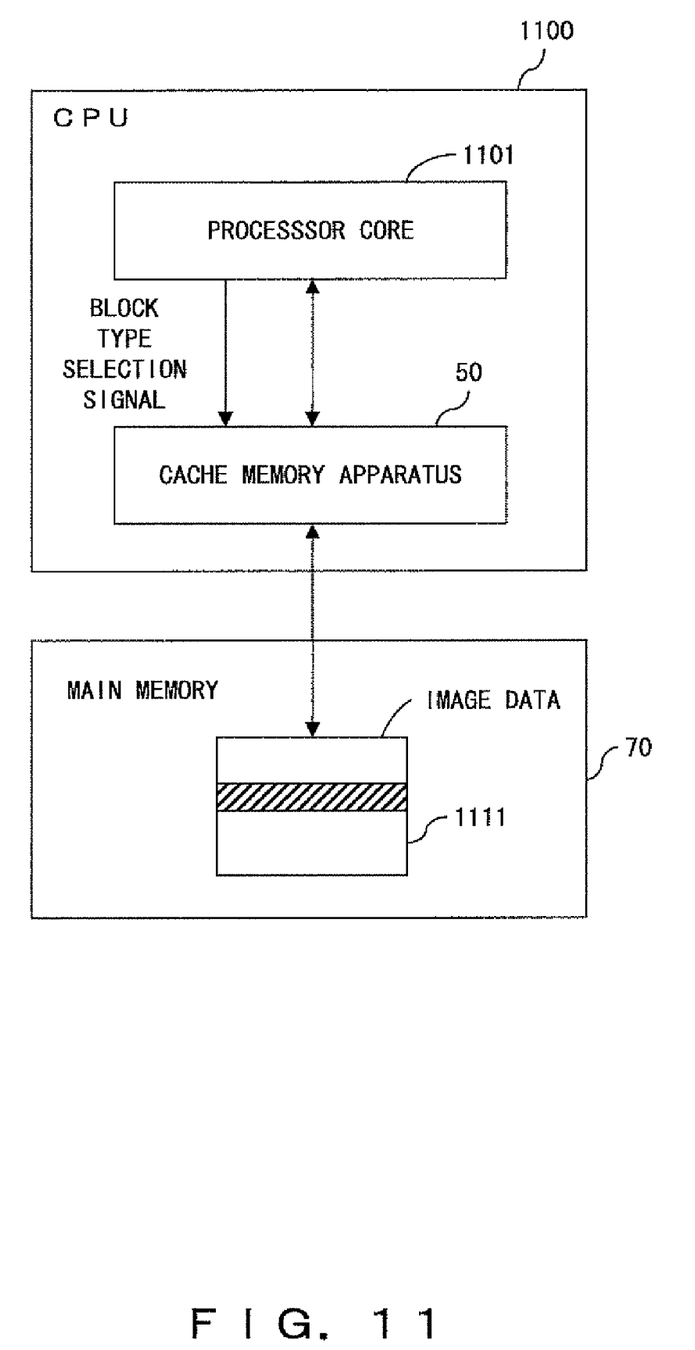
FIG. 11 is a diagram showing an application of a cache memory apparatus according to the present embodiment.

The cache memory apparatus 50 shown in FIG. 5 is used as an internal cache memory apparatus equipped on a CPU 1100 as shown in FIG. 11 for example. FIG. 11 indicates a configuration of using the cache memory apparatus 50 for storing a part of image data stored in the main memory 70 in order to process the image data in a higher speed. By this, a processor core 1101 is configured to process image data by obtaining it by way of the cache memory apparatus 50. A block type selection signal input to the index address selection unit 56 is output from the processor core 1101. Note that the cache memory apparatus 50 may be accomplished as an external cache memory apparatus, that is, an apparatus placed between the main memory 70 and CPU 1100.

The next is a specific description an access control for cache memory accomplished by a data structure of a cache address 51 by referring to the respective description diagrams shown in FIGS. 6 through 11B, before describing an operation of the cache memory apparatus 50 shown in FIG. 5. Data to be stored in the cache memory is assumed to be image data of one pixel data constituting one byte.

Figure 6:
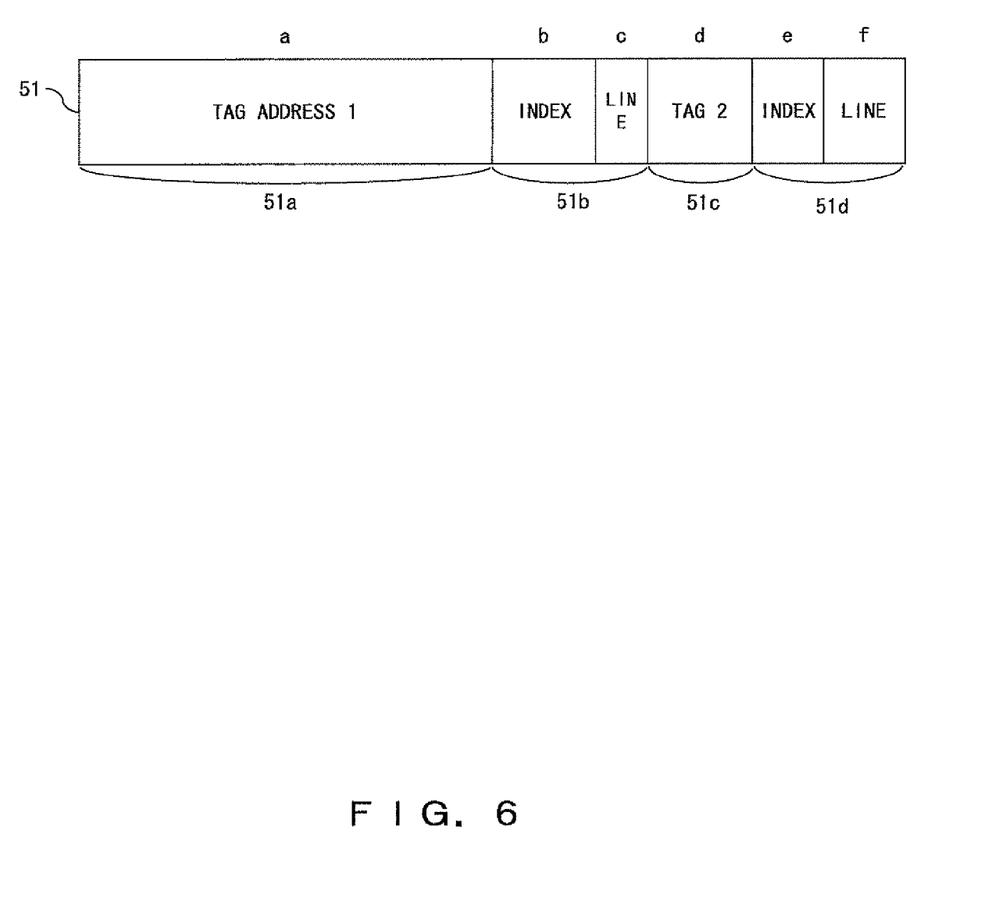
FIG. 6 is a diagram showing a data structure of a cache address 51.

FIG. 6 is a diagram showing a data structure of a cache address 51. As shown in FIG. 6, the second field 51*b* constituting the cache address 51 is at most divided into two subfields. In the case of being divided into two subfields, the subfield of the upper bit is used for storing an index address, while that of the lower bit is used for storing a line address. In the case of the second field 51*b* remaining as one subfield, that is, not being divided into subfields, the second field 51*b* is used for storing an index address. The fourth field 51*d* is always divided into two subfields, with the subfield of the upper bit being used for storing an index address while that of the lower bit being used for storing a line address. Here, the assumption is that the number of bits is "a" bits for the first field 51*a*, and likewise that, "b" bits for a subfield used for storing an index address in the second field 51*b*, "c" bits for a subfield used for storing a line address in the second field 51*b*, "d" bits for the third field 51*c*, "e" bits for a subfield used for storing an index address in the fourth field and "f" bits for a subfield used for storing a line address in the fourth field 51*d*. In the case of leaving the second field 51*b* as one subfield, the value of "c" is "0".

Figure 7:
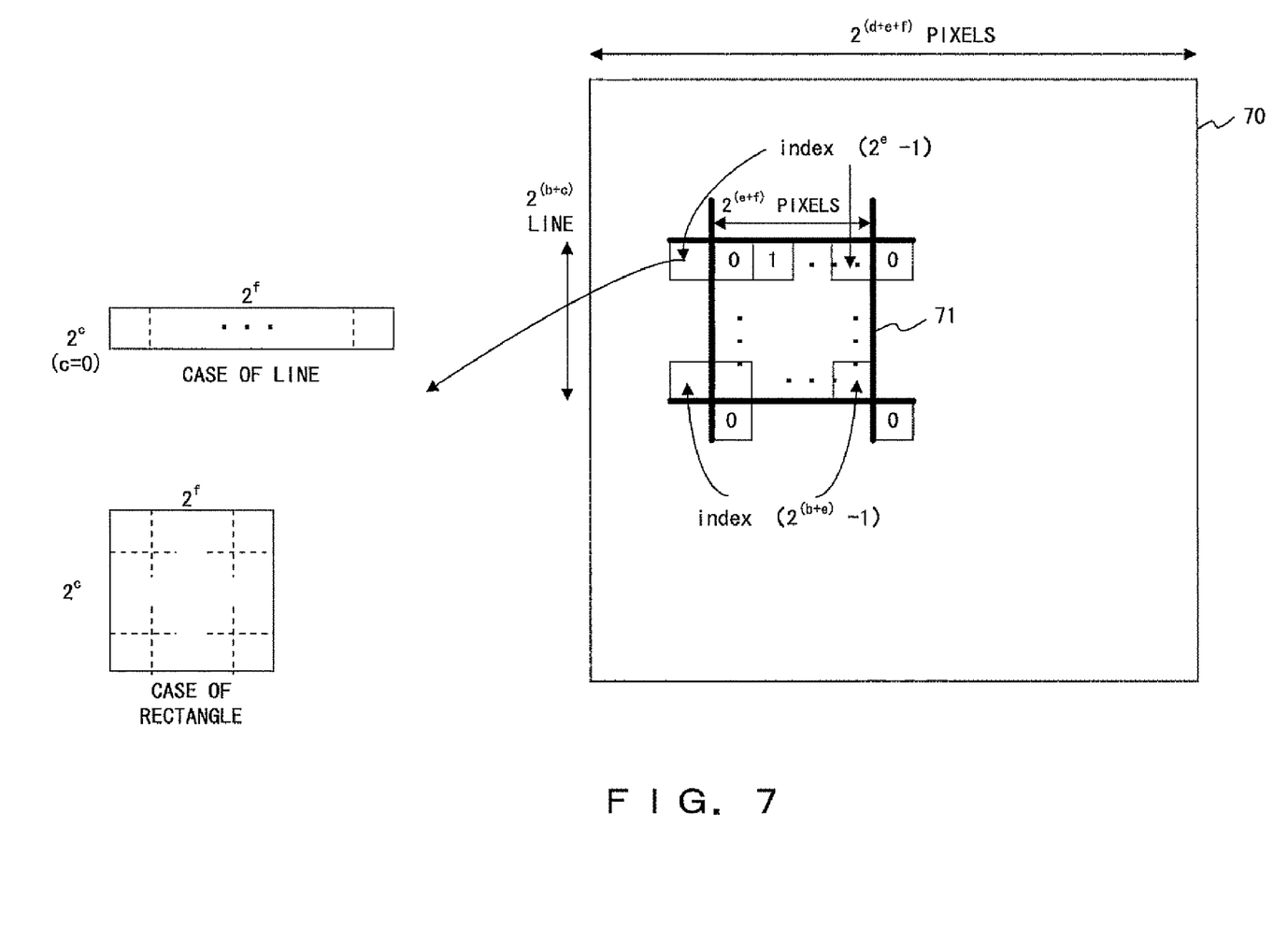
FIG. 7 is a diagram showing a zone of image data storable in cache memory by a data structure of a cache address 51.

FIG. 7 is a diagram showing a zone of image data storable in cache memory by a data structure of a cache address 51.

(d+e+f) bits are disposed as one for being capable of indicating a position of a pixel in the horizontal direction of an image. That is, a value of $2^{(d+e+f)}$ is configured to be larger than the total number of pixels which are line up in the horizontal direction. A data volume in the horizontal direction storable in the cache memory, that is, the number of pixels of which the data is storable is $2^{(e+f)}$, and the number of lines in the vertical direction is $2^{(b+c)}$. The number of indexes (i.e., entries) is $2^{(b+e)}$. Therefore, it is apparent that the area 71 enclosed by bold lines shown in FIG. 7 indicates the maximum zone of which the data is storable in the cache memory, with a frame within the area 71 indicating data to be stored in one entry. Each of the "0", "1", "index ($2^e-1$)" and "index ($2^{(b+e)}-1$)" indicates a value of an index address (noted as "index value" hereinafter) of the frame positioned on the upper left corner of the area 71. This is the same for other drawings herein.

In the blocks which are lined up in the horizontal direction, the index addresses in the fourth field 51*d* are individually different. In the blocks which are lined up in the vertical direction, the index addresses in the second field 51*b* are individually different. Therefore, it is possible to differentiate respective index values of individual blocks constituting the maximum zone 71 as shown in FIG. 7. This makes it possible to store all pieces of data of the maximum zone 71 in the cache memory.

A form of a block of which data is stored in one entry is controlled (managed) by the number of bits of subfields respectively used for storing line addresses in the second and fourth fields 51*b* and 51*d*. The number of pixels lined up in the horizontal direction is managed by the number of bits "f" of the subfield used for storing a line address in the fourth field 51*d*, and the number of lines lined up in the vertical direction is managed by the number of bits "c" of the subfield used for storing a line address in the second field 51*b*. That is, the form of the block is $2^f \times 2^c$ block (i.e., a block of $2^f$ pieces of pixels being lined up in the horizontal direction and the number of lines in the vertical direction being $2^c$ lines). Therefore, if the value of c is "0", it becomes a block constituted by $2^f$ pieces of pixels on one line, while if the value of c is not zero, it becomes a rectangular block of 2 lines or more in the vertical direction. The arrangements of the first and third fields 51*a* and 51*c*, and the numbers of bits thereof, are both fixed because of making arrangements of the second and fourth fields, and the numbers of bits thereof, both being fixed. Respective values of (c+f) and (b+e) are also fixed. Making these values fixed makes both of the total number of pixels in the horizontal direction and that of lines in the vertical direction of the maximum zone 71 a constant. This in turn makes both of the number of pixels (i.e., a data volume), of which the data is stored in one entry, and that of selectable entries (i.e., of indexes) a constant. Under such condition, the form of a block of which data is stored in one entry is managed by assigning values of c and f (also of b and e), that is, by assigning a bit (i.e., bit assignment) to subfields respectively dividing the second and fourth fields 51*b* and 51*d*. Therefore, it is possible to manage in such a manner that only the form of a block is different. This is the reason for fixing the respective values of (c+f) and (b+e) as well as the arrangements of the first and third fields 51*a* and 51*c*, and the numbers of bits thereof.

A high hit ratio can always be maintained even in the case of performing image processing because a plurality of blocks of data in the horizontal direction and that of data in the vertical direction can be stored in cache memory. Also, unlike the conventional cache memory apparatus noted in the patent document 3, a minimum amount of data required for an access can always be obtained from cache memory because a form of a block of which data is stored in one entry is configured to be changeable. Also, unlike the conventional cache memory apparatus noted in the patent document 2, it is possible to prevent an access control from becoming complex because a bit for storing an index address is not added to the cache address 51 per se.

FIGS. 8A through 10B are diagrams showing a bit assignment in the case of a cache address 51 being 32 bits and a block division of the maximum zone 71 accomplished by the bit assignment. The following are descriptions of a specific example of the bit assignment and a block division of the maximum zone 71 accomplished by the bit assignment by referring to FIGS. 8A through 10B. Here, the assumption includes: one byte for data of one address; one entry (i.e., a block) is capable of storing 16 bytes of data; and the number of entries is 256.

Figure 8A:
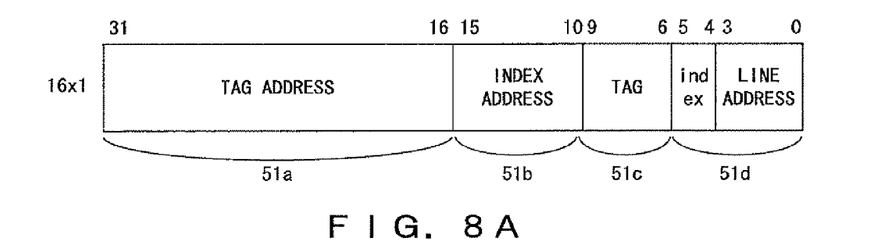
FIG. 8A is a diagram showing a bit assignment in the case of a cache address 51 being 32 bits (part 1)

In the case of a cache address 51 being 32 bits, the first through fourth fields 51*a* through 51*d* are respectively assigned by 16 bits, 6 bits, 4 bits and 6 bits from the upper most bit side as shown in FIG. 8A. In the example of bit assignment shown in FIG. 8A, 10 to 15 bits, and 4 to 5 bits, are assigned for an index address in the cache address 51. Such a content of assignment is expressed by "addr<15:10, 5:4>". This expression method is also used in the case of showing a content of other assignments.

Figure 8B:
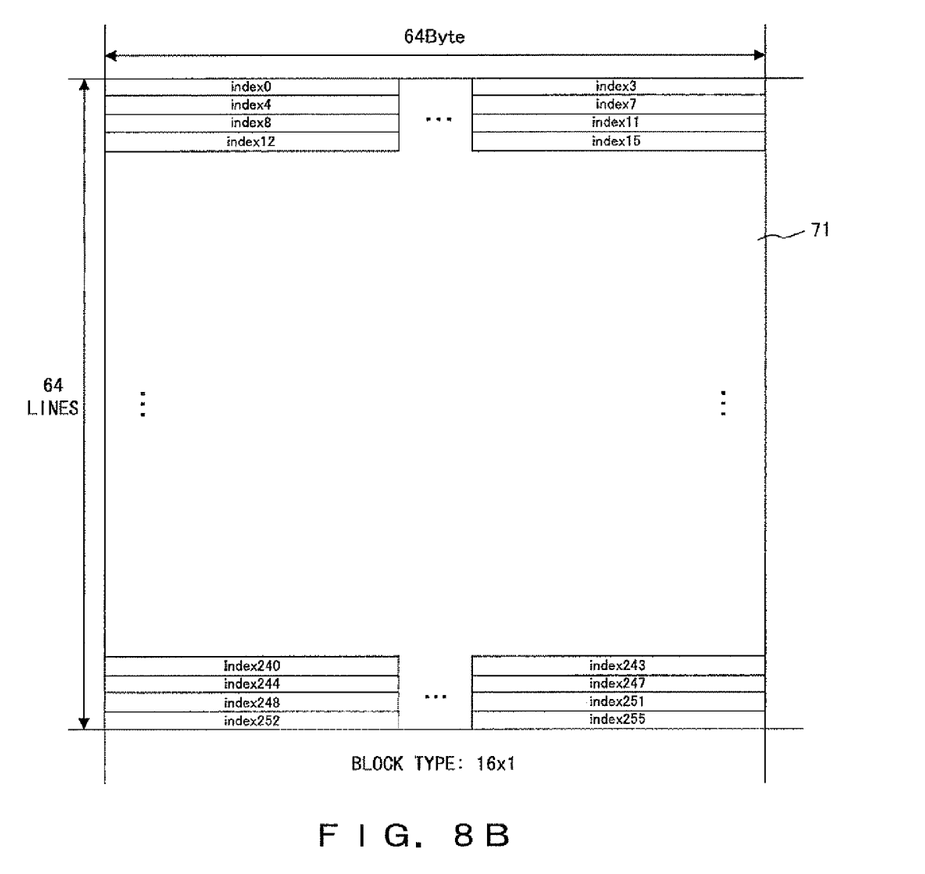
FIG. 8B is a diagram showing a block division of a maximum zone 71 accomplished by a bit assignment shown in FIG. 8A.

For a line address, 0 through 4 bits are assigned. Therefore, in the example of bit assignment shown in FIG. 8A, the form of a block of which data is stored in one entry becomes a 16×1 block constituted by 16 pixels being lined up in the horizontal direction. The numbers of bits of the second and fourth fields are both 6 bits. Because of this, the total number of pixels lined up in the horizontal direction of the maximum zone 71 is 64 pieces (i.e., a data volume of 64 bytes), and the total number of lines which are lined up in the vertical direction is 64 lines, as shown in FIG. 8B. Since the form of a block of which data is stored in one entry is a 16×1 block, the number of blocks lined up in the horizontal direction is 4 (=64/16) pieces, and the number of blocks line up in the vertical direction is 64 (=64/1) pieces.

Image processing in an image coding system is performed by the unit (i.e., block) specified by the applicable standard. One of the units, i.e., a macro block, is a 16×16 block according to most standards. Therefore, the example of a bit assignment shown in FIG. 8A is effective in the case of performing a process by the unit of macro block.

Figure 9A:
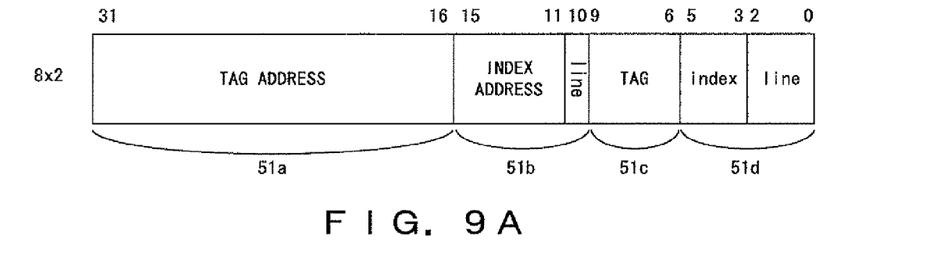
FIG. 9A is a diagram showing a bit assignment in the case of a cache address 51 being 32 bits (part 2)
Figure 9B:
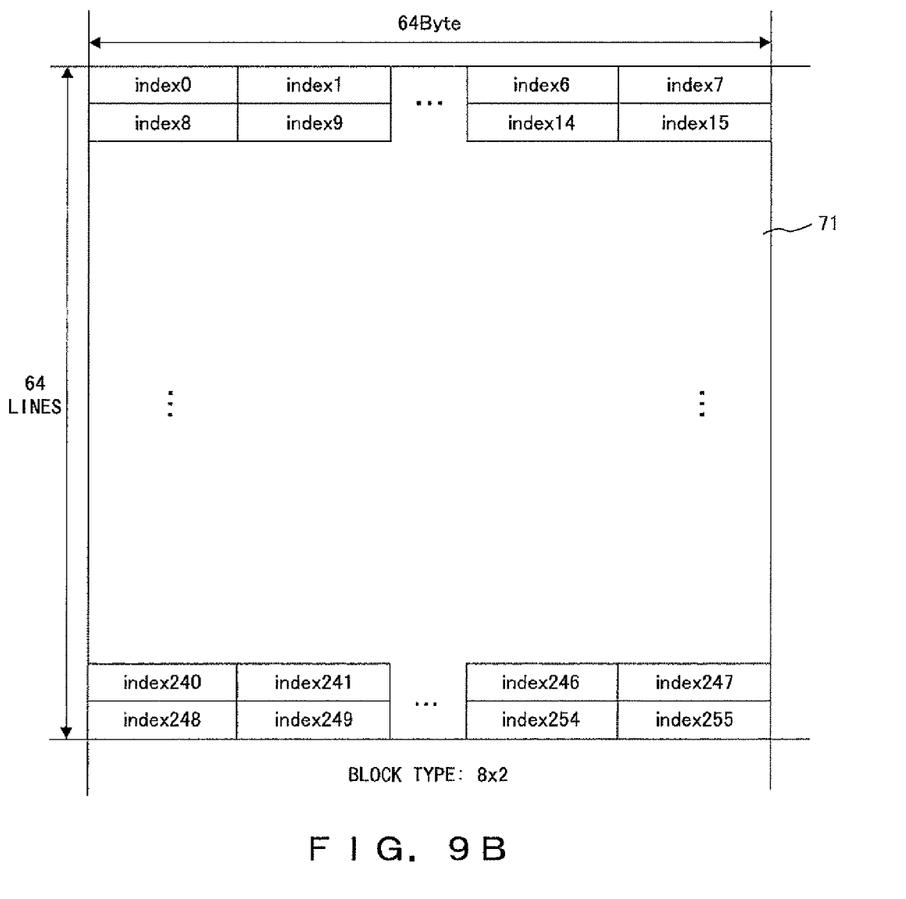
FIG. 9B is a diagram showing a block division of a maximum zone 71 accomplished by a bit assignment shown in FIG. 9A.

An example of a bit assignment shown in FIG. 9A is the case of storing an 8×2 block of data in one entry. For this reason, an addr<15:11, 5:3> is assigned for an index address. An addr<10:10, 2:0> is assigned for a line address. Therefore, the number of blocks lined up in the horizontal direction of the maximum zone 71 is 8 (=64/8) pieces, and the number of blocks lined up in the vertical direction is 32 (=64/2) pieces, as shown in FIG. 9B.

The image coding systems include one enabling a selection of a block size. There is a standard including such as an 8×4 block and 8×8 block as selectable block sizes (e.g., VC (Video Codec)—1 (SMPTE 421M)). Therefore, the example of a bit assignment shown in FIG. 9A is especially effective in the case of selecting an 8×4 block or 8×8 block in such a standard.

Figure 10A:
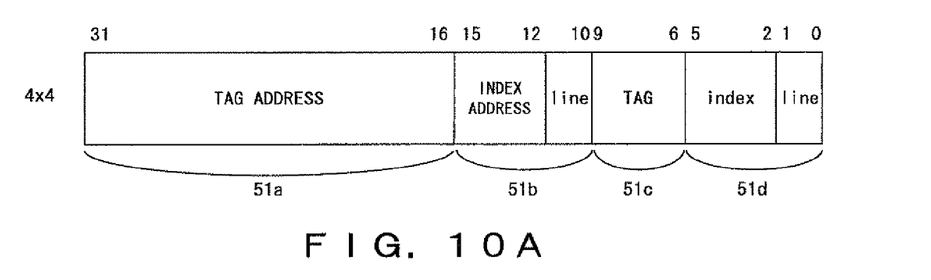
FIG. 10A is a diagram showing a bit assignment in the case of a cache address 51 being 32 bits (part 3)
Figure 10B:
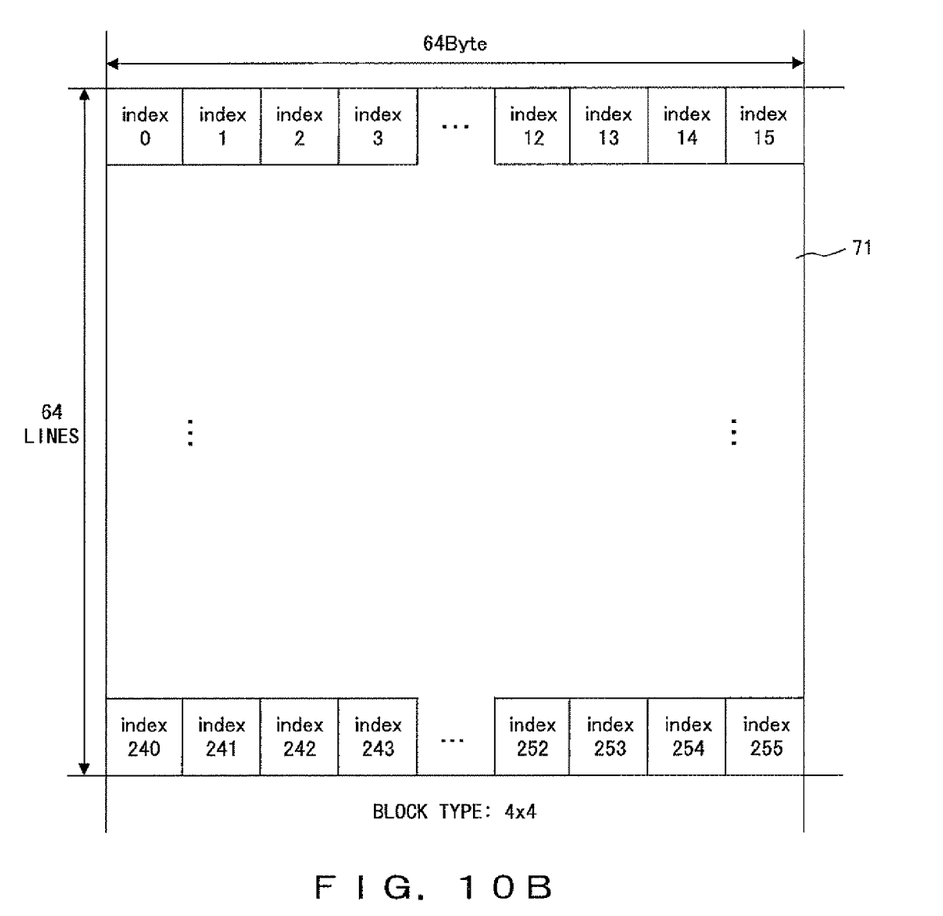
FIG. 10B is a diagram showing a block division of a maximum zone 71 accomplished by a bit assignment shown in FIG. 10A.

An example of a bit assignment shown in FIG. 10A is the case of storing a 4×4 block of data in one entry. For this, an addr<15:12, 5:2> is assigned for an index address. An addr<11:10, 1:0> is assigned for a line address. Therefore, the number of blocks lined up in the horizontal direction of the maximum zone 71 is 16 (=64/4) pieces, and the number of blocks line up in the vertical direction is 16 (=64/4) pieces, as shown in FIG. 10B.

Among the image coding systems, there are many systems making a 4×4 block as the unit or to be selectable (e.g., H. 264). Therefore, the example of a bit assignment shown in FIG. 10A is especially effective in the case of performing image processing by the unit of 4×4 block in such a standard.

As described above, a block size differs depending on the content of image processing, and the most optimal bit assignment also changes with the block size. Because of this, the configuration is such that a bit assignment is dynamically changed according to the content of image processing so as to store data in cache memory by a more appropriate bit assignment. The following is a detailed description on an operation of the cache memory apparatus 50 according to the present embodiment by returning to FIG. 5.

As shown in FIG. 11, a block type selection signal is output to the cache memory apparatus 50 from the processor core 1101. The block type selection signal is disposed for selecting a bit assignment which is validated among selectable bit assignments. For example, if the selectable bit assignments are three manners as shown in FIGS. 8A, 9A and 10A, the block type selection signal is a 2-bit signal. A relationship between a value of the 2-bit and a form of a block (i.e., a bit assignment) of which data is stored in one entry may be determined as follows for example. The following also shows assigned bits for an index address (i.e., a total of 8 bits) according to the form of the block.

| Block type selection signal <1:0> | Index address <7:0> |
|---|---|
| 00 (16x1 block) | addr<15:10, 5:4> |
| 01 (8x2 block) | addr<15:11, 5:3> |
| 10 (4x4 block) | addr<15:12, 5:2> |

The processor core 1101 outputs a block type selection signal, to the cache memory apparatus 50, according to a block size determined by a standard, such as an image coding system, or according to a selected block size. The index address selection unit 56 selects bits disposed for an index address in the second and fourth fields 51b and 51d according to a value of the block type selection signal and compounds the selected bits. The compounding is carried out by arranging a bit specified for an index address in the second field 51a to the upper bit, while by arranging a bit specified for an index address in the fourth field 51d to the lower bit. An 8-bit index address generated by such compounding is output to the tag part 52.

Contrarily, unselected bits for an index address in the second and fourth fields 51a and 51d are compounded on an as required basis as bits for a line address and the compounded result is output to the data selector 55. The reason for carrying out the compounding on an as required basis is that there is a possibility of the entirety of second field 51b being disposed for an index address as shown in FIG. 8A. In the case of a bit for a line address existing in the second field 51b, a compounding is performed with the aforementioned bit as the upper bit and a bit for a line address of the fourth field 51d as the lower bit. By this, a 4-bit line address is output to the data selector 55 in either case.

In the case of a read request for reading data from the data part 53, an index address is output to the tag part 52, thereby a tag address of an entry which is selected by the value being read. The address comparator 54 compares the tag address read from the tag part 52 with the tag addresses respectively stored in the first and third fields 51a and 51c, and the comparison result is output as hit information. If these tag addresses are identical, the hit information indicates that the target data exists, that is, it is a hit, while, if they are not identical, it indicates that the target data does not exist, that is, it is a miss-hit. A tag address stored in the third address 51c is handled as a lower bit of the tag address stored in the first field 51a for example.

By an output of an index address to the tag part 52, the data of an entry selected by its value is read from the data part 53. The data selector 55 extracts, and outputs, target data from among read data from the data part 53 according to the value of a line address. The hit information output from the address comparator and the data output from the data selector 55 are transferred to the processor core 1101.

Contrarily, in the case of a write request for storing data in the data part 53, tag addresses of the first and third fields 51a and 51c are stored in entries specified by index addresses of the tag part 52. In the entry of the data part 53, the data transferred from the main memory 70 is stored. The storing of the data is carried out according to a line address output from the index address selection unit 56.

Note that the present embodiment is configured such that the arrangement and number of bits of the first and third fields 51a and 51c are all fixed, and therefore the data of these fields 51a and 51c are directly output as tag addresses to the address comparator 54 or tag part 52; an alternative configuration, however, may be in a manner to furnish with an index address selection unit 56, or the like, to extract data handled as a tag address from a cache address 51. Or it may be in a manner to have one constituent component extract a tag address, an index address and a line address. The reason for being configured to have the index address selection unit 56 extract an index address and a line address is that, if a bit to be handled as an index address is determined at the second and fourth fields 51$b$ and 51$d$, the remainder of bits can be automatically determined as bits for line addresses, respectively.

The present embodiment premises the case of storing image data for image processing in cache memory, the present invention, however, may be applied to any data regardless of a kind of data provided that a hit ratio is decreased by a reason similar to the image processing.

What is claimed is:

1. A cache memory control method used for controlling an access to cache memory comprising, for each entry, a data part for storing data and a tag part for storing a tag address which is for indexing the data, comprising:
    dividing an address for accessing the cache memory into a first field through a fourth field from an uppermost bit side, the accessing being performed for each entry in units of block data having $2^c$ lines×$2^f$ pixels in the cache memory, wherein c and f are integers and are changed dynamically according to a signal sent from a processor core which corresponds to content of image processing;
    using the first and third fields for storing tag addresses;
    dividing the second field into a first subfield for storing an index address and a second subfield for storing a line address, the second subfield having c bits; and
    dividing the fourth field into a third subfield for storing an index address and a fourth subfield for storing a line address, the fourth subfield having f bits,
    wherein dividing an address for accessing the cache memory includes compounding unselected bits for an index address in the second and fourth fields as bits for a line address and the compounded result is to be output to a data selector.

2. The cache memory control method according to claim 1, wherein an arrangement of said third field and the number of bits of said third field are fixed.

3. The cache memory control method according to claim 1, wherein dynamically changing an assignment of numbers of bits to the first to fourth subfields which are divisions of said second and fourth fields respectively.

4. The cache memory control method according to claim 3, wherein a total of numbers of bits of the first to fourth subfields is fixed.

5. The cache memory control method according to claim 3, wherein a number of pixels, which are lined up in horizontal direction of an image block storing data in one entry, controlled by number of bits of the fourth subfield; and a number of lines, which are lined up in vertical direction of the image block controlled by number of bits of the second subfield, when data to be stored in said cache memory is image data which is an image divided into pixels.

6. The cache memory control method according to claim 1, wherein the first subfield is positioned at upper bit side than the second subfield and the third subfield is positioned at upper bit side than the fourth subfield.

7. A cache memory control method used for controlling an access to cache memory comprising, for each entry, a data part for storing data and a tag part for storing a tag address which is for indexing the data, comprising:
    dividing an address for accessing the cache memory into a first through sixth fields from the uppermost bit side, the accessing being performed for each entry in units of block data having $2^c$ lines×$2^f$ pixels in the cache memory, wherein c and f are integers and are changed dynamically according to a signal sent from a processor core which corresponds to content of image processing;
    using the first and fourth fields for storing tag addresses;
    using the second and fifth fields for storing index addresses; and
    using the third and sixth fields for storing line addresses, wherein the third field has c bits and the sixth field has f bits, and
    wherein dividing an address for accessing the cache memory includes compounding unselected bits for an index address in the second, third, fifth and sixth fields as bits for a line address and the compounded result is to be output to a data selector.

8. A cache memory apparatus accessing cache memory comprising, for each entry, a data part for storing data and a tag part for storing a tag address which is for indexing the data, comprising:
    a first extraction unit configured to extract stored tag addresses in an address specified for accessing the cache memory, the address being divided into a first through a fourth fields from the uppermost bit side, and compounding unselected bits for an index address in the second and fourth fields as bits for a line address, wherein the compounded result is to be output to a data selector, the tag addresses being stored in the first field and the third field, the accessing being performed for each entry in units of block data having $2^c$ lines×$2^f$ pixels in the cache memory, wherein c and f are integers and are changed dynamically according to a signal sent from a processor core which corresponds to content of image processing; and
    a second extraction unit configured to extract index addresses stored in a first subfield and a third subfield, and line addresses stored in the second subfield having c bits and the fourth subfield having f bits, the first subfield and the second subfield constituting the second field, the third subfield and the fourth subfield constituting the fourth field.

9. The cache memory apparatus according to claim 8, wherein said second extraction unit changes the number of bits of the first to fourth subfields and extracts said index addresses and line addresses in compliance to an external instruction.

10. A cache memory apparatus accessing cache memory comprising, for each entry, a data part for storing data and a tag part for storing a tag address which is for indexing the data, comprising:
    a first extraction unit configured to extract tag addresses, an address specified for accessing the cache memory, the address being divided into a first through a sixth fields from the uppermost bit side, and compounding unselected bits for an index address in the second, third, fifth and sixth fields as bits for a line address, wherein the compounded result is to be output to a data selector, the tag addresses being stored in the first field and the fourth field, the accessing being performed for each entry in units of block data having $2^c$ lines×$2^f$ pixels in the cache memory, wherein c and f are integers and are changed dynamically according to a signal sent from a processor core which corresponds to content of image processing;
    a second extraction unit configured to extract index addresses stored in the second field and the fifth field; and
    a third extraction unit configured to extract line addresses stored in the third field having c bits and the sixth field having f bits.

* * * * *